W. H. ELLIOT.

Bedstead Fastening.

No. 6,447. Reissued May 25, 1875.

Witnesses;
D. Lewis
C. H. Ellyard

Inventor
Wm. H. Elliot

UNITED STATES PATENT OFFICE.

WILLIAM H. ELLIOT, OF NEW YORK, N. Y.

IMPROVEMENT IN BEDSTEAD-FASTENINGS.

Specification forming part of Letters Patent No. 93,186, dated August 3, 1869; reisue No. 6,447, dated May 25, 1875; application filed August 17, 1874.

*To all whom it may concern:*

Be it known that I, W. H. ELLIOT, of the city, county, and State of New York, have invented an Improved Bedstead-Fastening, of which the following is a specification:

My invention relates to improvements in bedstead-fastenings; and it consists, first, in in a bedstead-fastening in which the end of the rail has a mortise or cut for for the reception of the rail end of the tenon, within which projections or shoulders are formed, by cutting one portion of the rail below another. Upon these shoulders, corresponding surfaces or shoulders formed on the tenon rest, so that the tenon cannot be drawn out of the rail-mortise without breaking away a portion of the rail, the shoulders on the post end of the tenon being diagonal, and the post-mortise having diagonal shoulders formed out of the material of the post. My invention further consists in the employment of a side rail having a tenon attached thereto, provided with diagonal shoulders on its post end, in combination with a post having diagonal shoulders forming a component part of said post, the surfaces of the diagonal shoulders of the post and tenon being tangential to each other, as hereinafter more fully set forth.

Figure 1:
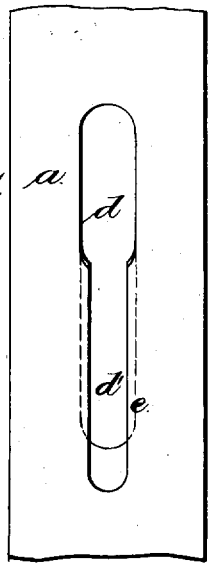
Figure 2:
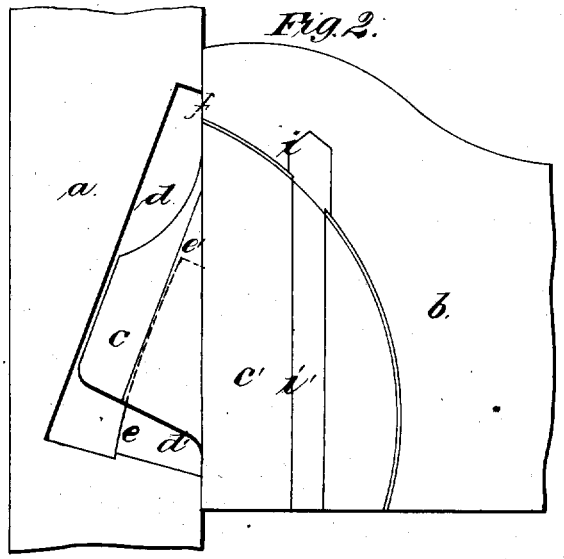
Figure 5:
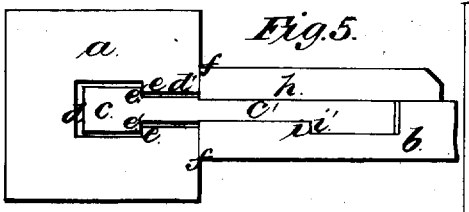
Figure 4:
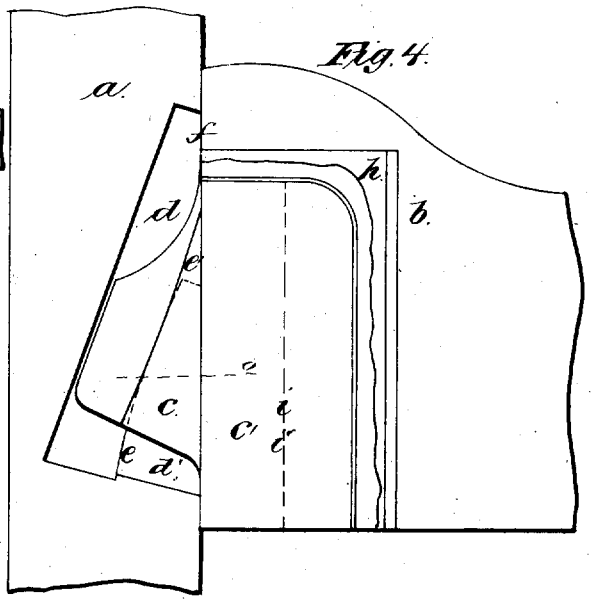
Figure 3:
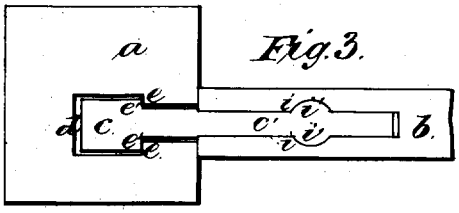

Figure 1 is an elevation of a portion of a bed-post showing the improved mortise. Fig. 2 is a vertical section of a post and side rail, showing a tenon-connection between the post and rail. Fig 3 is a horizontal section of a post and rail, in dotted line *n*, of Fig. 2. Fig. 4 is a vertical section of a post and side rail, showing a tenon connection covered by a cleat. Fig. 5 is a horizontal section of the same, in the dotted line *o*, of Fig. 4.

In the annexed drawing, *a* represents a bedstead-post and *b* the side rail. *c* is that portion of the tenon which enters the post. *c'* is that portion which is fastened in or to the side rail. *d* is the wide part of the mortise in the post, and *d'* is the narrow part of the same. *e* represents the diagonal shoulder within the post-mortise, formed out of the material of the post. *e'* represents the diagonal shoulders formed upon the sides of that portion of the tenon which enters the post. *f* represents the end of the rail, and *h* represents the cleat placed over the tenon. The cleat is broken away in Fig. 4, to show the tenon. My improved tenon is composed of a body having upon it one or more shoulders at the rail end thereof, and shoulders at its post end. I provide for the alteration of the angle of the diagonal shoulders in the post-mortise, arising from shrinkage, by curving longitudinally one or both of the shoulders, *e* and *e'*, as shown in Figs. 2 and 4, so that their surfaces will be tangential to each other. The shoulder *e* is curved in both figures, and the shoulder *e'* is curved in Fig. 4, so that they only touch each other near their middle. *i* represents shoulders formed out of the material of the rail, and *i'* shoulders formed upon that part of the tenon which is fastened in or to the rail, and these shoulders may be either straight or curved, as shown.

What I claim as new, and desire to secure by Letters Patent, is—

1. In a bedstead-fastening, a tenon provided with shoulders at each end, the shoulders on the post end of the tenon being diagonal, in combination with a side rail having a shouldered mortise, and a post having a mortise with diagonal shoulders, the shoulders of the mortises in both post and rail being formed out of the material of the said parts, substantially as and for the purpose set forth.

2. A side rail having a tenon attached thereto, provided with diagonal shoulders *e'*, in combination with a post having diagonal shoulders *e* forming a component part of said post, the surfaces of the diagonal shoulders of the post and tenon being tangential to each other, substantially as and for the purpose set forth.

WM. H. ELLIOT.

Witnesses:
D. LEWIS,
C. L. OSGOOD.